April 5, 1927.
P. A. KOEHRING
TWIN MIXER CONCRETE PAVING MACHINE
1,623,622
Filed March 27, 1926    2 Sheets-Sheet 1
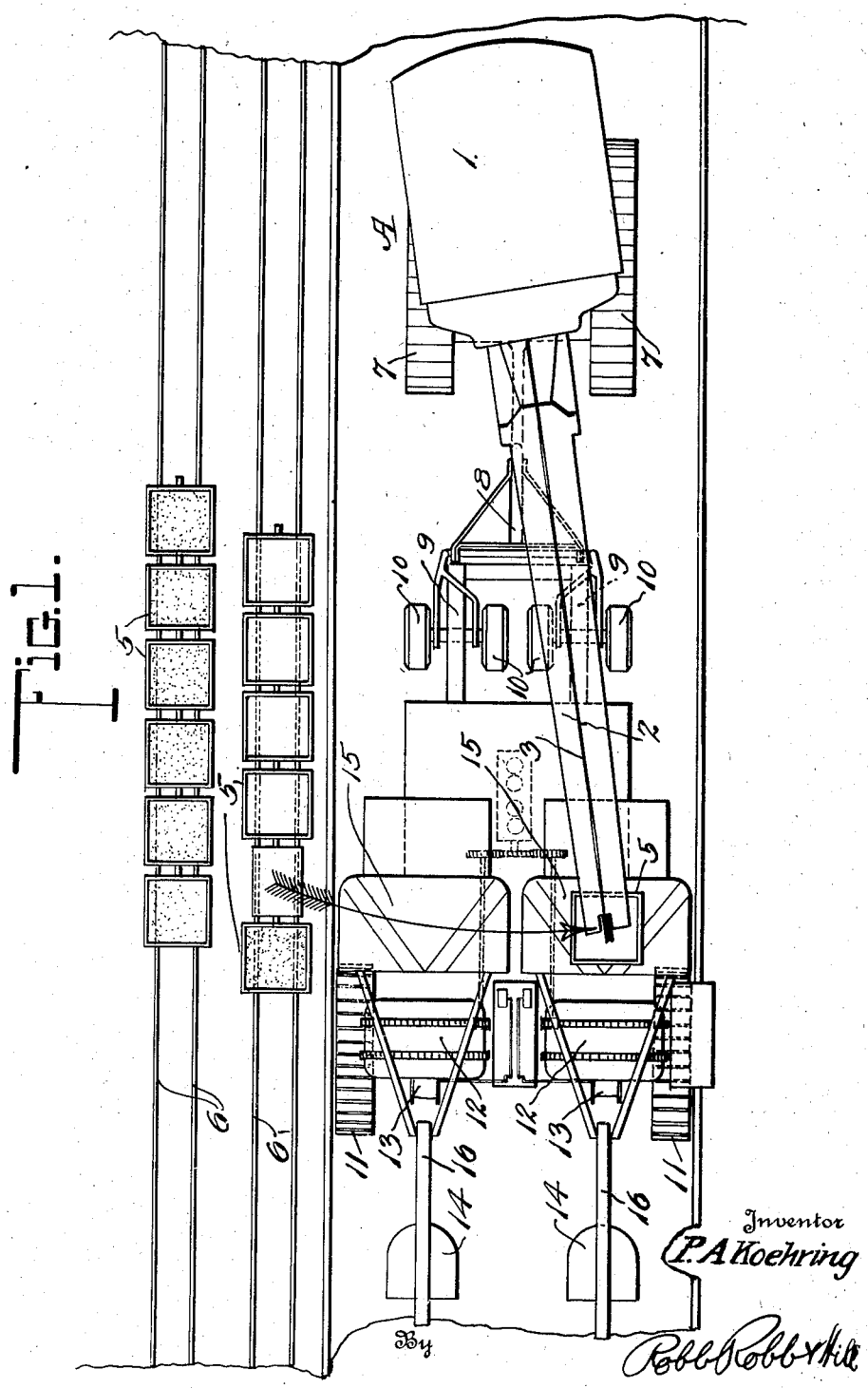

April 5, 1927.
P. A. KOEHRING
1,623,622
TWIN MIXER CONCRETE PAVING MACHINE
Filed March 27, 1926    2 Sheets-Sheet 2
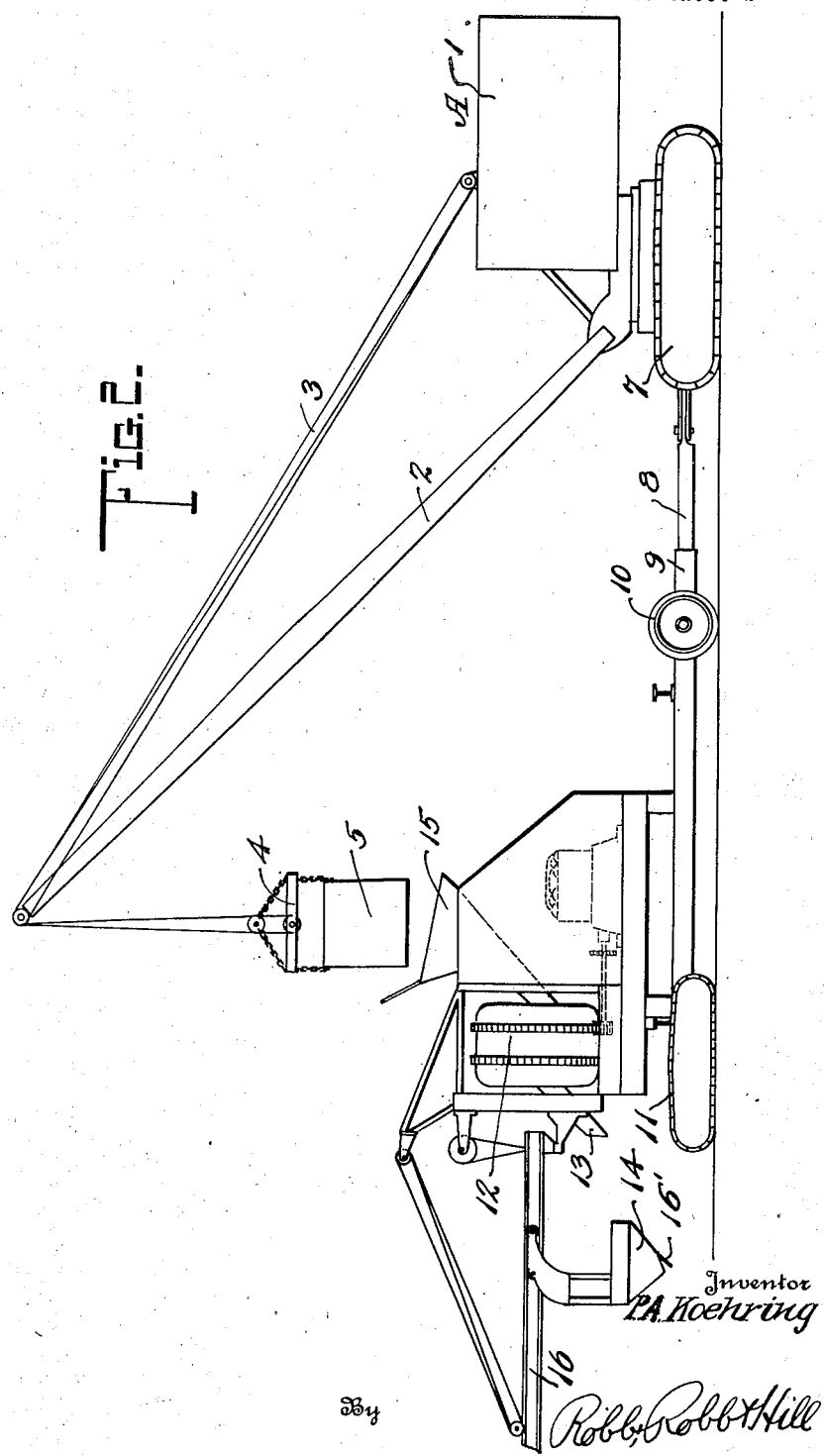

Patented Apr. 5, 1927.

1,623,622

UNITED STATES PATENT OFFICE.

PHILIP A. KOEHRING, OF MILWAUKEE, WISCONSIN, ASSIGNOR TO KOEHRING COMPANY, OF MILWAUKEE, WISCONSIN, A CORPORATION.

TWIN-MIXER CONCRETE-PAVING MACHINE.

Application filed March 27, 1926. Serial No. 97,932.

This invention comprises a specially designed portable concrete mixing plant, particularly useful for large paving operations. The width of concrete roads and pavement generally is being materially increased these days in order to handle the traffic requirements. With a single mixing machine paver, a road of limited width may be laid economically as the machine progresses and works in conjunction with the usual auxiliary apparatus.

In view of the increased demands upon the mixing plant in large paving operations, I have devised a portable paving machine of large capacity by using a plurality of mixing machines and distributing apparatuses therefor, mounted upon the same portable base, and movable progressively as the road or pavement is built.

In conjunction with the mixing machines arranged in tandem, I am able to use a loading means, common thereto, for which purpose I employ a loading crane of portable type. The said crane is advantageously employed as a hauling means for advancing the portable mixing and distributing plant as the paving work is done.

Considerable advantage is derived from the foregoing design of mixing and distributing and loading plant, because obviously the common loader from the plurality of mixing machines may be cooperating with one machine for loading the same while the other machine is operating to mix the aggregates preparatory to distribution, and vice versa. In this way I obtain an overlapping of the cycles of operations of the several mixing machines, materially economizing the amount of time required for laying down the aggregates upon the subgrade, as compared with the work that may be performed and by the use of two separate and independent paving machines. Moreover, the capacity of my machine, constructed with the mixing and distributing means in tandem, is such as to enable a road of considerable width to be laid at one continuous operation, something which is much to be desired in certain types of road construction today.

In the accompanying drawings:

Figure 1 is a plan view of a typical road paving operation, illustrating the adaption of my invention thereto in the form of a twin mixing and distributing plant, and associated loader common thereto and forming the draft means for advancing the entire apparatus as the work progresses.

Figure 2 is a side view of the same.

In the illustration of the road paving operations, as found in the drawings, the aggregates are brought up to the portable mixing plant by industrial railway cars, the bodies of which constitute hoppers adapted to be elevated from the trucks of the cars in order to dump them into the receiving hoppers for the mixers. It may be noted, however, that dependent upon particular conditions surrounding the paving operation being conducted, the aggregates may be haulded to the mixing plant in motor trucks, or any conventional method of handling these aggregates for large road building operations may be resorted to.

The portable mixing, distributing and loading plant, embodying the invention, comprises a crane A which may generally be of a known type, comprising a rotating or swing body 1, having the boom 2, and cable hoist apparatus 3. The cable hoisting apparatus 3 will be equipped with suitable grapple means 4 for engagement with the batch box or hopper bodies of the industrial cars; said batch boxes being designated 5.

The grapple means aforesaid may be constructed in accordance with United States Letters Patent of Heine, No. 1,468,472, issued September 18, 1923; or Lichtenberg, No. 1,521,246, issued December 30, 1924; or Tranaas, No. 1,565,688, issued December 15, 1925. By use of such grapple apparatus, by mere control of the cable means 3, the dumping of the hopper 5 may be effected.

The crane A comprises also a traction base 7 which may be of any suitable type, and the crane is connected by draft means 8 with the portable traction support or frame 9 of the mixing and distributing plant. This portable support 9 is mounted upon wheels or rollers 10 and in this traction device 11, or it may otherwise be supported to enable it to travel readily when pulled by the progressive forward movement of the crane A traveling under its own power. In effect, therefore, the traction means or supporting bases of the loading crane, mixing and distributing plant is one unitary operating base.

The mixing plant preferably comprises the twin mixers 12, each equipped with a discharge chute 13 by which it may discharge its mixed aggregates into the bucket 14, a receiving hopper 15 being provided for each of the mixers for conducting the dumped aggregates received from the batch boxes 5 into suitable chutes which conduct the aggregates from the hoppers 15 into the receiving ends of the mixers.

The boom and bucket apparatus includes the boom 16, having the bucket 14 adapted to traverse the same, said bucket having the dumping door 16 pivoted at its lower end for controlling the spreading of the concrete as it is laid down upon the sub-grade by the distributing attachment of the particular mixer. This boom and bucket mixer is well known and may be of the type presented in my Letters Patent Reissue No. 13,617, granted to me September 16, 1913, or the Letters Patent of Lichtenberg, No. 1,141,470, granted June 1, 1915.

The twin mixers 12 are arranged side by side and the receiving hoppers 15 thereof are adapted to be served by the crane boom 2 and its grappling apparatus connected in conjunction with the grappling means 4 to shift the batch boxes 5 from a point above the tracks 6 to a point above the hoppers 15 aforesaid.

With the foregoing understanding of the construction of my portable paving plant, the operation of the same will be largely self-evident. It is possible, with a large capacity plant of this sort, to set the crane A in forward motion along with the mixing and distributing apparatus of the plant, and as the crane slowly progresses it will be operated by the crane operator to carry the batch boxes 5 from the industrial railway cars to the hoppers 15. The mixers 12 will thus be supplied constantly and alternately with aggregates, and these aggregates discharged in mixed condition into the distributor 14 for distribution after the known manner.

It is obvious that the boom and cable apparatus of the crane may supply one mixer 12, and the mixing of the latter may be commenced and continued while the boom and cable apparatus is afterward operated to charge the other mixer. The operations of loading the mixers overlap, as well as the mixing actions thereof, in such a way that the mixed aggregates may be handled by the twin mixer plant construction in much less time than would be required if the mixers were operated independently of one another, and in this lies the very considerable economy of the construction of loading, mixing and distributing apparatus which I have devised. A single operator at the crane and a single operator at the mixing plant will suffice for controlling the entire operations of the complete machinery.

It will be understood that the mixers 12 may be operated by a single engine at the driving connections with the ring gears of the mixers for rotation of the latter, or each mixer may have its own separate engine or motor for turning the same. This phase of the invention is not material thereto.

Having thus described my invention, what I claim as new, and desire to cover by Letters Patent, is:—

1. In a concrete mixing and distributing machine, a portable traction base adapted to progressively move along a road subgrade where concrete pavement is to be laid, a plurality of mixers carried by said traction base and arranged transversely of the direction of progressive movement of the same, a crane connected with the traction base to move therewith and comprising crane mechanism for loading the mixers aforesaid by alternately charging aggregates thereinto, means associated with the mixers for distributing concrete mixed therein and discharged therefrom and means for propelling the traction base and crane to cause advance of the machine progressively over the sub-grade in the manner set forth.

2. In a portable machine of the class described, a traction base, a plurality of mixers mounted thereon, distributing means for the mixers, and a loading device common to the mixers and adapted to alternately supply said mixers with charges of aggregates to be mixed therein; said loading device comprising a crane having a swing body, a boom on said swinging body equipped with cable hoisting apparatus, the said boom and cable hoisting apparatus being adapted to be swung so as to supply aggregates to the mixers by alternate cooperation therewith.

3. In a portable loading, mixing and distributing machine, a traction base, a plurality of mixers mounted thereon for independent mixing operations, distributing means for receiving mixed aggregates from the mixers and distributing the same to a road sub-grade, and a portable self-propelling crane connected with said traction base to advance the same over the sub-grade, said crane having loading means common to the said mixers.

4. In a portable loading, mixing and distributing machine, a traction base, a plurality of mixers mounted thereon for independent mixing operations, distributing means for receiving mixed aggregates from the mixers and distributing the same to a road sub-grade, and a portable self-propelling crane connected with said traction base to advance the same over the sub-grade, said crane comprising a swing body, and boom and cable hoisting apparatus mounted on said swing body and shiftable thereby from a point at one side of the said traction base to discharge positions serving either one of the said mixers.

5. In a loading, mixing and distributing plant of the class described, in combination, a traction base, a plurality of mixers mounted thereon for independent operation, said mixers being arranged side by side transversely of the line of movement of the traction base, distributing means for the mixers to receive mixed aggregates therefrom and lay them upon the sub-grade, a loading and propelling means for the mixers comprising hoppers leading to the mixers to supply the aggregates thereto, a portable self-propelling crane arranged in advance of said traction base, draft means between the crane and the traction base by which the traction base may be advanced by movement of the crane, said crane embodying boom and cable hoisting means adapted to be swung by swinging the body of the crane, and batch box grappling means carried by the cable hoisting means for engagement with and dumping of batch boxes hoisted from one side of the machine and carried over the hoppers by which the mixers are supplied with the aggregates to be mixed.

6. In a loading, mixing and distributing plant of the class described, in combination, a traction base, a plurality of mixers mounted thereon for independent operation, said mixers being arranged side by side transversely of the line of movement of the traction base, distributing means for the mixers to receive mixed aggregates therefrom and lay them upon the sub-grade, a loading and propelling means for the mixers comprising hoppers leading to the mixers to supply the aggregates thereto, a portable self-propelling crane arranged in advance of said traction base, draft means between the crane and the traction base by which the traction base may be advanced by movement of the crane, said crane embodying boom and cable hoisting means adapted to be swung by swinging the body of the crane, and batch box grappling means carried by the cable hoisting means for engagement with and dumping of batch boxes hoisted from one side of the machine and carried over the hoppers by which the mixers are supplied with the aggregates to be mixed, the distributing means for the mixers comprising separate independently operable boom and bucket distributing devices.

In testimony whereof I affix my signature.

PHILIP A. KOEHRING.